United States Patent [19]

Eckett et al.

[11] 3,920,869

[45] Nov. 18, 1975

[54] METHOD FOR PRODUCING A THREE LAYER COATING ON A GLASS CONTAINER AND THE RESULTING ARTICLE

[75] Inventors: David Vivian Eckett, London; Christopher Hillary Ellen, Barnet, both of England

[73] Assignee: United Glass, Ltd., United Kingdom

[22] Filed: Mar. 11, 1974

[21] Appl. No.: 450,218

[30] Foreign Application Priority Data
Mar. 14, 1973 United Kingdom............... 12257/73

[52] U.S. Cl. ............. 428/35; 65/60 A; 215/DIG. 6; 427/314; 427/407; 427/419; 428/432; 428/424; 428/522; 428/523; 428/539
[51] Int. Cl.². B05D 1/36; B05D 3/02; B32B 17/06; C03C 17/00
[58] Field of Search ............. 117/72, 94, 88, 124 A, 117/124 B, 124 D, 124 E, 167, 124 T; 65/60; 215/DIG. 6; 427/407, 419, 314; 428/35, 432, 474, 522, 523, 539

[56] References Cited
UNITED STATES PATENTS

| | | | |
|---|---|---|---|
| 3,323,889 | 6/1967 | Carl | 117/94 |
| 3,352,707 | 11/1967 | Pickord | 117/72 |
| 3,352,708 | 11/1967 | Lyon | 117/72 |
| 3,379,559 | 4/1968 | Gerhardt | 117/94 |
| 3,418,153 | 12/1968 | Levene | 117/72 |
| 3,418,154 | 12/1968 | Rawski | 117/124 D |
| 3,420,693 | 1/1969 | Schoher | 117/88 |
| 3,425,859 | 2/1969 | Steigelwan | 117/72 |
| 3,445,269 | 5/1969 | Bruss | 117/88 |
| 3,554,787 | 2/1971 | Plymale | 117/124 E |
| 3,667,926 | 6/1972 | Green | 117/124 D |
| 3,811,921 | 5/1974 | Crawford | 117/124 T |

FOREIGN PATENTS OR APPLICATIONS 1,180,131  2/1970  United Kingdom

Primary Examiner—Ralph Husack
Assistant Examiner—William H. Schmidt
Attorney, Agent, or Firm—Cushman, Darby & Cushman

[57] ABSTRACT

A process for treating a glass container which has been subjected to a hot and metal oxide treatment which comprises applying to the glass surface a coating of oleic acid, palmitic acid or stearic acid whilst the glass is at a temperature within the range from 90°C to 130°C, and then applying an insoluble organic coating whilst the glass is at a temperature within the range from 90°C to 150°C.

7 Claims, No Drawings

METHOD FOR PRODUCING A THREE LAYER COATING ON A GLASS CONTAINER AND THE RESULTING ARTICLE

BACKGROUND OF THE INVENTION

This invention relates to the surface treatment of glass containers, especially glass bottles, so as to provide the containers with a lubricous and abrasion resistant glass surface.

It is generally known that when glass containers are treated at a high temperature, for example 500°C, with a metal compound, for example tin tetrachloride, and then after annealing the containers are further treated with a suitable organic compound, such treated glass containers possess surfaces having a high degree of lubricity and abrasion-resistance, so that when brought into contact with one another, for example on handling and filling lines, the containers slide smoothly against each other, and the glass does not become abraded or damaged.

A substantial number of organic compounds are known for treating the glass containers after the annealing process. These known compounds include polyethylene, glycols, esters of polyethylene glycols and of glycerol, polyethylenes, fatty acids, amides and many others. Some of these organic compounds are soluble in water and others are insoluble. Where a soluble organic compound is used for the treatment, the glass surface may, after washing, lose a substantial amount of its lubricity and resistance to abrasion, and it is therefore customary, when treating glass containers which in use have to be washed, to use an insoluble organic material. These insoluble organic coatings are reasonably resistant not only to water but also to detergents commonly used for washing glass containers, for example alkaline solutions which may contain phosphate or silicates etc. at temperatures up to 80°C. Nevertheless, even the most effectively insoluble of the organic coatings at present known will only offer a limited protection against repeated alkaline washing, and it has been found that after only a few washes in 5% sodium hydroxide solution at 75°C, the organic coating is largely removed, and the inorganic metal oxide coating becomes degraded, thereby rendering the glass surface non-lubricous and susceptible to damage by abrasion. Because of this, it has been customary only to treat the surfaces of glass containers intended to be used once, so that the washing problem does not arise. Thus, it would be pointless to apply the above-mentioned treatment to, for example, returnable beer or milk bottles which have an average usage of 30 to 40 times.

SUMMARY OF THE INVENTION

It is an object of the present invention to provide a process for treating glass containers which will enable them to resist repeated alkaline washings.

It has now been discovered that glass containers that have been given a hot end metal oxide treatment followed by a particular combination of cold end treatments possess an unexpectedly high resistance to alkaline washing, and that such treated containers may be used many times under normal conditions without loss of lubricous and abrasion-resistant properties.

According to the present invention a process for treating glass containers having been subjected to a hot end metal oxide treatment comprises applying to the glass surface a coating of a fatty acid, whilst the glass is at a temperature within the range from 90°C to 130°C, and then applying an insoluble organic coating whilst the glass is at a temperature within the range from 90°C to 150°C.

Suitable fatty acids for use in the process of the invention are oleic acid, palmitic acid and stearic acid, oleic acid being preferred. A convenient method of applying this material to the surfaces of the containers is, for example, by blowing a mist of, e.g. vaporised oleic acid in air around the containers.

The insoluble organic coating, to be applied when the glass is in the temperature range 90° to 150°C, is suitably a polyolefine, for example polyethylene, which may be applied as an aqueous emulsion. Other examples include a copolymer of ethylene and vinyl acetate, nylon, or one of the large number of compounds known for application to glass containers as an insoluble cold end coating.

As mentioned, the sequential application of a fatty acid and an insoluble organic coating to the glass surface follow the "hot end" treatment of the glass surface to form a metal oxide coating thereon. Many such "hot end" treatments are known and all are suitable herein. Examples of such treatment are those described in our U.K. Patent Specifications Nos. 1,024,468, 1,115,342, 1,187,783, 1,187,784, 1,244,832, 1,257,647 and 1,270,523.

The use in the treatment of glass containers of a fatty acid alone or of an insoluble organic material alone is well known, but in neither case is the alkaline resistance of the treated containers sufficient to maintain lubricity and abrasion-resistance for more than a small number of uses. It was therefore surprising, and totally unexpected, that the combination of the two treatments gave to the glass an alkaline resistance which was many times greater than the resistance imparted by any single treatment.

DESCRIPTION OF THE PREFERRED EMBODIMENTS

The following Examples are given to illustrate the invention.

EXAMPLE 1

Glass bottles, immediately after forming, were treated with a solution prepared by reacting tin tetrachloride and n-butyl acetate, the final solution containing 10% tin (w/v), the liquid being applied to the bottles through two sprays, one on either side of a treatment tunnel straddling the conveyor conveying the bottles from the forming machine to an annealing lehr. The throughput through each spray was 3.0 ml. per minute. After treatment the bottles were passed into the annealing lehr in which they were subjected to a normal annealing treatment. Towards the end of the annealing schedule, when the bottles were at a temperature of approximately 120°C, the bottles were treated with a mist of oleic acid which was generated by atomising oleic acid into a heated chamber, and allowing a mixture of the vapourised oleic acid with air to contact the bottles. The oleic acid feed was maintained at around 0.3 milliliters per minute. Immediately following this treatment, and while the glass bottles were at a temperature greater than 90°C they were treated with an emulsion of polyethylene stabilised with potassium oleate (total solids 0.2%) following which the bottles were cooled to room temperature.

Other sets of bottles were produced, for comparison purposes, by following the above procedure but either omitting the hot end coating, or by omitting one or both of the cold end coatings, or by omitting all the coatings.

Samples of each of the sets of bottles were then tested for resistance to alkali by placing the bottles in a bath containing 1% (w/v) aqueous solution of sodium hydroxide maintained at a temperature of 80°C. After 4 hours at this temperature the bottles were removed from the bath, rinsed, and examined for abrasion resistance, using as a comparison standard some bottles of each set not subjected to alkaline washing. It was found that after the 4 hour washing period only the bottles fully treated with the hot end and dual cold end treatments had retained any substantial degree of abrasion resistance.

EXAMPLE 2

Bottles were treated as described in Example 1 with a hot end treatment followed by cold end treatments with oleic acid vapour and polyethylene emulsion. For comparison purposes another set of bottles was treated in like manner, but omitting the oleic acid treatment. Bottles were then subjected to washing in four consecutive baths according to the following schedule.

| Bath No. | NaOH Concentration %w/v | Temperature | Washing Time |
|---|---|---|---|
| 1 | 2.5 | 49°C | 2.5 mins. |
| 2 | 2.5 | 66°C | 2.5 mins. |
| 3 | 0.75 | 71°C | 2.5 mins. |
| 4 | 0.12 | 54°C | 2.5 mins. |

A traverse through all four baths constituted one "trip", and bottles were subjected to washing schedules of up to 20 trips, assessment of loss of scratch resistance being made after each 5 trips. It was found that bottles fully treated with the hot end and dual cold end treatments successively withstood at least 30 trips without loss of abrasion resistance, whereas the bottles which had not been treated with oleic acid substantially lost all abrasion resistance after only 10 trips.

What we claim is:
1. A glass container having a three-layer surface coating, said coating comprising:
   a. a layer of a metal oxide on the glass surface;
   b. a layer of a fatty acid which is oleic acid, palmitic acid or stearic acid, superposed on the metal oxide layer;
   c. a coating layer of a water insoluble organic compound comprising a polyolefine, an ethylene-vinyl acetate copolymer, or nylon, superposed on the fatty acid layer.
2. A glass container according to claim 1 wherein the coating layer (c) is a polyolefine.
3. A glass container according to claim 2 wherein the polyolefine is polyethylene.
4. A glass container according to claim 3 wherein the fatty acid is oleic acid.
5. A glass container according to claim 1 wherein the coating layer (c) is an ethylene-vinyl acetate copolymer.
6. A glass container according to claim 1 wherein the coating layer (c) is nylon.
7. A process for treating a glass container which has been subjected to a hot end metal oxide treatment which comprises applying to the glass surface a coating of a fatty acid selected from the group consisting of oleic acid, palmitic acid and stearic acid whilst the glass is at a temperature within the range from 90°C to 130°C and then applying a coating of a water insoluble organic compound selected from the group consisting of a polyolefine, an ethylene-vinyl acetate copolymer and nylon whilst the glass is at a temperature within the range from 90°C to 150°C.

* * * * *